*(12)* United States Patent
Brehler et al.

(10) Patent No.: US 7,190,962 B2
(45) Date of Patent: Mar. 13, 2007

(54) NETWORKED WIRELESS COMMUNICATIONS DEVICE PROGRAMMED TO IDENTIFY AND ELIMINATE PROBABLE MULTIPATH ERRORS TO ENHANCE ACCURACY IN CORRECTING SLEEP CLOCK FOR THERMALLY INDUCED ERRORS

(75) Inventors: Matthias Brehler, Boulder, CO (US); Arthur J. Neufeld, Longmont, CO (US); Jing Liu, Boulder, CO (US); John Charles May, Boulder, CO (US); Kurt W. Otte, Erie, CO (US)

(73) Assignee: Qualcomm Incorporated, San Diego, CA (US)

( * ) Notice: Subject to any disclaimer, the term of this patent is extended or adjusted under 35 U.S.C. 154(b) by 491 days.

(21) Appl. No.: 10/816,991

(22) Filed: Apr. 1, 2004

(65) Prior Publication Data

US 2005/0221847 A1 Oct. 6, 2005

(51) Int. Cl.
*H04B 7/01* (2006.01)
(52) U.S. Cl. .................... 455/502; 455/343.1; 455/574
(58) Field of Classification Search ................ 455/502, 455/343.1, 574, 343, 67.13, 208, 259, 434, 455/515, 127.1; 370/311
See application file for complete search history.

(56) References Cited

U.S. PATENT DOCUMENTS

| 5,943,613 | A | * | 8/1999 | Wendelrup et al. ....... 455/343.1 |
| 6,016,312 | A | * | 1/2000 | Storm et al. ................. 370/311 |
| 6,212,398 | B1 | * | 4/2001 | Roberts et al. ............. 455/502 |
| 6,356,538 | B1 | * | 3/2002 | Li ............................... 370/311 |

FOREIGN PATENT DOCUMENTS

EP 1 134 897 AW1 9/2001
EP 1 162 752 A1 12/2001

* cited by examiner

*Primary Examiner*—Matthew D. Anderson
*Assistant Examiner*—Tan Trinh
(74) *Attorney, Agent, or Firm*—Thomas R. Rouse; Thien T. Nguyen; Sandra L. Godsey

(57) ABSTRACT

A method for correcting operation of the sleep oscillator (116) of a wireless communications device (100). Sleep oscillator frequency is estimated (412) so as to compensate for estimated temperature induced errors. In estimating temperature induced errors, errors (504) in sleep oscillator frequency are treated as being temperature induced errors (522), but probable multipath errors are bounded (410, 520) to predetermined sleep clock error maxima (602) corresponding to sleep duration over which the error occurred.

27 Claims, 7 Drawing Sheets

PRIOR ART

the phone

NETWORKED WIRELESS COMMUNICATIONS DEVICE PROGRAMMED TO IDENTIFY AND ELIMINATE PROBABLE MULTIPATH ERRORS TO ENHANCE ACCURACY IN CORRECTING SLEEP CLOCK FOR THERMALLY INDUCED ERRORS

BACKGROUND

1. Field

The present invention generally relates to wireless communications devices used in wireless communications networks. More particularly, the invention concerns a wireless communications device that seeks to correct its sleep clock to account for temperature induced errors.

2. Background

A mobile phone periodically awakens from the sleep state for a brief length of time, in order to receive paging signals from base stations alerting the phone to incoming calls and also to perform other tasks such as searching for pilot signals of nearby base stations, etc. The timing of this wake state is critical because it must overlap a predetermined network-established time. If the wake state occurs too late or too early, the phone will miss its opportunity to send/receive signals at the network-established time. In this case, the mobile phone would miss any arriving calls, and the phone might lose network service entirely.

There is a need, therefore, for accurate methods of correcting a sleep clock operating in a wireless environment.

DETAILED DESCRIPTION

The nature, objectives, and advantages of the invention will become more apparent to those skilled in the art after considering the following detailed description in connection with the accompanying drawings.

Mobile phone designers are faced with a variety of different engineering challenges. One of the most perplexing problems is the necessity of using battery power to drive the phone's transceiver, speaker, microphone, display, and all other on-board electronics. A battery may only provide a finite amount of power until exhaustion, at which time the phone ceases to work. Of course, most mobile phone batteries are rechargeable, but this requires access to a power source.

Consequently, mobile phones have been designed with the ability to operate in various low power modes. With the absence of any outgoing or incoming calls, a mobile phone is in an "idle" state. At times, some phone models enter a "normal sleep" state where the phone selectively disables various circuitries such as its transceiver, central processor, and certain other hardware. At this point, the phone consumes hardly any current. At precisely scheduled intervals, the phone briefly awakens, chiefly to receive paging signals from base stations alerting the phone to incoming calls and for other reasons such as searching for pilot signals of nearby base stations, etc.

Some models are even capable of entering a "deep sleep" mode, in which the mobile phone cannot achieve communications with any base stations for some length of time. In this mode, the phone ceases all communications, and simply waits for user input while powering-down to an even greater extent. Conducting deep sleep mode is fairly straightforward, because the phone simply stops most operations.

But as for the normal sleep state, there are special challenges to be overcome. The chief difficulty is accurately keeping track of time. The fundamental principle is that when a mobile phone sleeps, it uses a dedicated sleep oscillator for timekeeping. And, in a perfect world, such an oscillator would track the progress of time perfectly. However, fluctuations in the phone's temperature cause the oscillator to speed up or slow down. Although significant fluctuations in the phone's temperature may result from extreme weather or other ambient air behavior, a more significant influence occurs because the phone heats during use and cools while dormant.

One seemingly sensible approach would be to simply lengthen the phone's wake state to guarantee communication with the base station. This is undesirable because it would draw more battery power, shortening the phone's functional time before recharge is necessary. Another approach would be to correct the phone's oscillator to a time reference signal from the network some time during the wake state. Even with such frequent clock resetting, however, the phone's oscillator may still wander excessively.

Figure 1A:
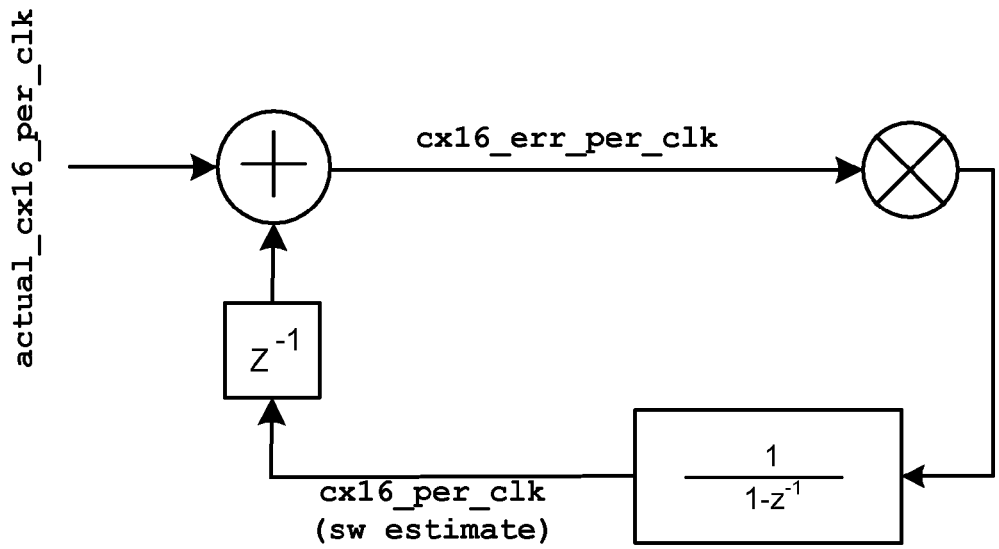
FIG. 1A is a block diagram of a control loop for correcting sleep clock operation according to the prior art.

Another seemingly sensible solution might be to use circuitry of the phone itself to track the oscillator's frequency. This approach recognizes the difficulty of changing the sleep clock's oscillator frequency, so instead it tries to track the sleep clock's actual frequency based on errors between the oscillator and the network reference signal to account for temperature. FIG. 1A shows a control loop that models an example of this approach. Although this approach addresses some of these issues, the algorithm is not particularly accurate with frequently repeating sleep cycles of brief duration. In fact, temperature induced errors may actually get worse with the foregoing approach. In addition, correcting for temperature errors is more difficult than it seems because there are other errors that may camouflage the insidious influence of temperature on oscillator operation.

One such error is "multipath." Namely, when the phone wakes up and receives the first available base station timing signal, that signal could be delayed with respect to the last time that the same timing signal was used by the phone. This delay may be caused by a change in reflection from buildings, earth, and other structures. Thus, arrival of this timing signal at the phone would be delayed with respect to its expected time, falsely making even a perfectly timed oscillator appear to be running fast. The opposite could also occur, where the oscillator falsely appears to be running slow due to the initial timing signal being delayed by multipath to a greater extent than the later timing signal.

Accordingly, progress remains to be made in the area of recognizing and minimizing temperature induced errors in timekeeping during mobile phones' sleep cycles.

A method is disclosed for correcting a sleep clock of a wireless communication device. Sleep oscillator frequency is estimated so as to compensate for estimated temperature induced errors. In estimating temperature induced errors, errors in sleep oscillator frequency are treated as being temperature induced errors, but probable multipath errors are bounded to predetermined sleep clock error maxima corresponding to sleep duration over which the error occurred.

Hardware Components & Interconnections

Introduction

Broadly, one aspect of the present disclosure is a wireless communications device that operates in a wireless communications network. The device utilizes a sleep clock to regulate when the device wakes from a reduced power sleep state. The device is configured to eliminate probable multipath errors in order to increase the accuracy of correct temperature induced errors in the operation of its sleep clock. One example of an application for this technology is in a wireless mobile telephone in a code division multiple access (CDMA) type network. To increase the accuracy of temperature compensation, the device also identifies and limits probable multipath errors. Of course, this disclosure broadly anticipates any other wireless communication technology in which remote devices utilize sleep clocks.

Wireless Telephone

Figure 1B:
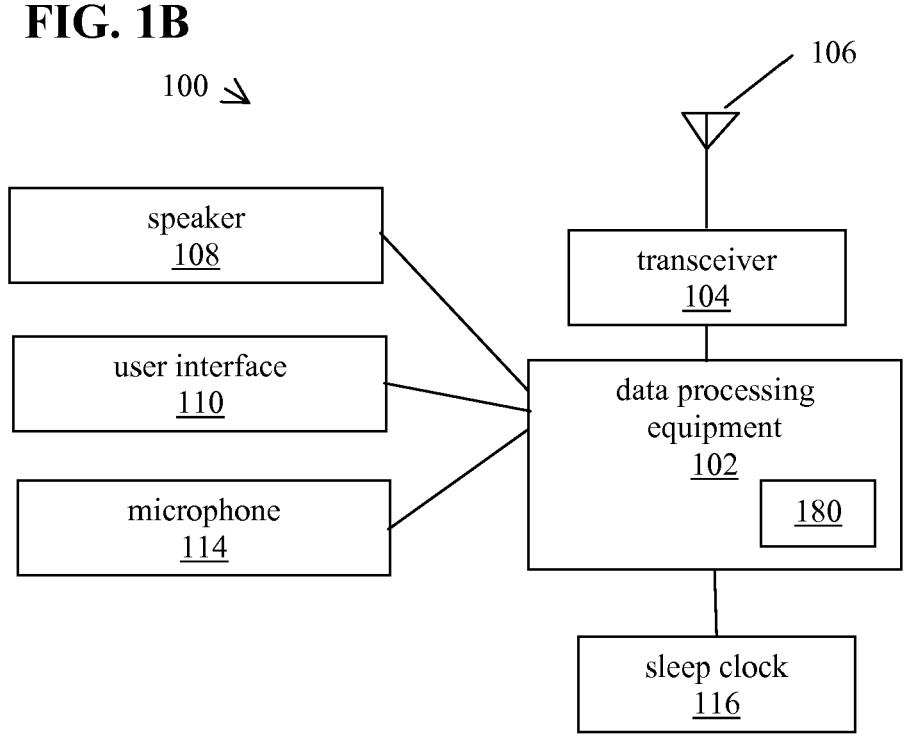
FIG. 1B is a block diagram of some hardware components and interconnections in a wireless communications device.

FIG. 1B illustrates a wireless communications device 100, which in this example is a wireless telephone. The device 100 includes a speaker 108, user interface 110, microphone 114, transceiver 104, antenna 106, data processing equipment 102, and a sleep clock 116, along with any other conventional circuitry that may vary depending upon the communications technology, application, phone features, etc. The equipment 102 may comprise one or more logic circuits, discrete circuit elements, application specific integrated circuits (ASICs), microprocessors, computers, or other apparatus. Various specific examples are discussed below in conjunction with FIGS. 2–3. The equipment 102 serves to manage operation of the components 104, 108, 110, and 114 as well as signal routing between these components.

The foregoing components are powered by a battery (not shown). In order to preserve battery power, some or all of the components 108, 110, 114, 104 may be partially or completely shut down during certain reduced power sleep states. In addition, some or all of the equipment 102 may be powered off during this time. In addition to keeping track of time during sleep states, the sleep clock 116 triggers wakeup of some or all of the components 108, 110, 114, 104, 102. Although different implementations will be apparent to ordinarily skilled artisans (having the benefit of this disclosure), the sleep clock 116 in this example comprises an oscillator with a nominal frequency. This frequency may vary according to temperature, the compensation for which is one subject of the present disclosure.

Relatedly, the equipment 102 additionally includes an error correction unit 180 that is programmed, electrically configured, or otherwise structured to recognize and then correct temperature induced errors in the operation of the sleep clock 116. The unit 180 may comprise a subcomponent of the equipment 102 that comprises separate software, hardware, firmware, or a combination of these or other technologies. The unit 180 is discussed in greater detail below.

Although the device 100 is discussed in terms of a wireless mobile unit, the device 100 may be mobile or stationary. Furthermore, the device 100 may comprise a data device that communicates through a wireless channel or through a wired channel, for example using fiber optic or coaxial cables. In addition to (or instead of) wireless and wireline phones, the device 100 may be configured to implement various other devices including but not limited to PC card, compact flash, external or internal modem, etc.

Error Correction Unit

As mentioned above, the unit 180 (FIG. 1B) serves to recognize and then correct temperature induced errors in the operation of the sleep clock 116. The unit 180 may comprise one or more logic circuits, discrete circuit elements, application specific integrated circuits (ASICs), microprocessors, computers, or other apparatus of the same or different technology as the equipment 102.

Figure 1C:
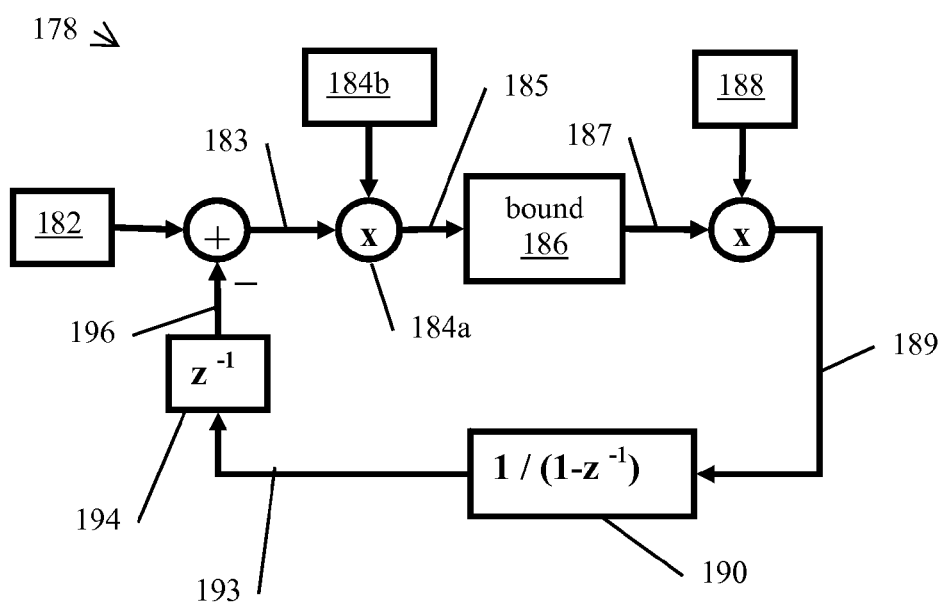
FIG. 1C is a schematic diagram of a control loop for correcting sleep clock operation.

To more specifically explain the unit 180, FIG. 1C describes a control loop 178. The loop 178 models the operation of the unit 180, rather than describing actual circuit components. At 185, the loop 178 receives a timing error. Rather than seconds or minutes, the timing error in this example is described in terms of parts of CDMA chips. Signal 185 represents the overall error in the duration of the last sleep state, that is, how early or late the last sleep cycle ended, measured in CDMA chips. This error is obtained from the system reacquisition process. In some cases, this error may be on the order of one CDMA chip.

The error between the estimated and the actual frequency is 183, but this frequency error is not observed directly, only the timing error 185 that results from it. To model the fact that the timing error rather than the frequency error is observed, the frequency error 183 is multiplied by 184b at 184a. This operation is performed naturally, rather than by affirmative acts of circuitry or programming. The following illustrates an example. In this example, the frequency estimate is 600.00 cx16 per sleep clock cycle (cx16 is a 16th part of one CDMA chip) and the desired sleep state duration is 1.28 s, which is equivalent to 1.28*16*1.2288e6=25165824 cx16. Here, 25165824cx16 corresponds to 41943 sleep clock cycles when the estimate of 600.00 cx16_per_clk is used. Next sleep occurs for that many sleep clock cycles. If the true frequency is 600.01 cx16 per sleep clock cycle, the phone did not sleep for 25165824 cx16 as desired, but rather for 41943*600.01cx16=25166219cx16 or 1.28002 . . . seconds. Thus, when reacquiring the system, an error of 25166219−25165824=395 cx16 (approximately 25 chips) is observed.

To model the generation of the timing error 185, FIG. 1C includes the delay 194 (which models the sleep time), the inaccessible oscillator frequency 182 (which is unknown), and a multiplication 184a by the number of sleep clocks slept 184b.

Depending on certain factors, a bounding unit 186 selectively limits the error 185 to a prescribed maximum. The issue of whether to bound the signal 185 and what maximum to use is discussed in conjunction with FIG. 5 below.

Output 187 of the bounding unit 186 is multiplied by a given gain 188 to produce an amplified signal 189. The gain 188 serves to regulate the speed of the loop 178 and maintain it in a stable mode of operation. In one example, an adaptive gain is used for 188. In this example, a gain inversely proportional to the number of sleep clock oscillations slept (exactly one half over the number of oscillations) is used for sleep states greater than $2^{17}$ sleep clock oscillations, and a fixed gain of $2^{-18}$ is used for sleep states of $2^{17}$ and less. The purpose of the adaptive gain is to keep the time-constant of the loop constant for sleep states lasting up to $2^{17}$ sleep clock oscillations.

The amplified signal 189 is fed to an accumulator 190, which serves to adjust the estimate 193. In other words, a bounded (operation 186) and scaled (multiplication 188) version of the timing error 185 is added to the estimate 193. This estimate is then used to calculate the new sleep duration in terms of sleep clock oscillations. The delay 194 models the duration of the sleep state. The difference between the delayed estimate 196 and the physical oscillator frequency 182 together with the multiplication 184*a* model the creation of the timing error 185, which arises because the estimate 196 of the sleep clock frequency did not match with the actual clock frequency 182.

Digital Data Processing Apparatus

Data processing entities such as components 102, 180, 116, 104 of FIG. 1B, or any one or more of their subcomponents, may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, channel, interface, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation

Having described various structural features, some operational aspects of the present disclosure are now described.

Signal-Bearing Media

Figure 2:
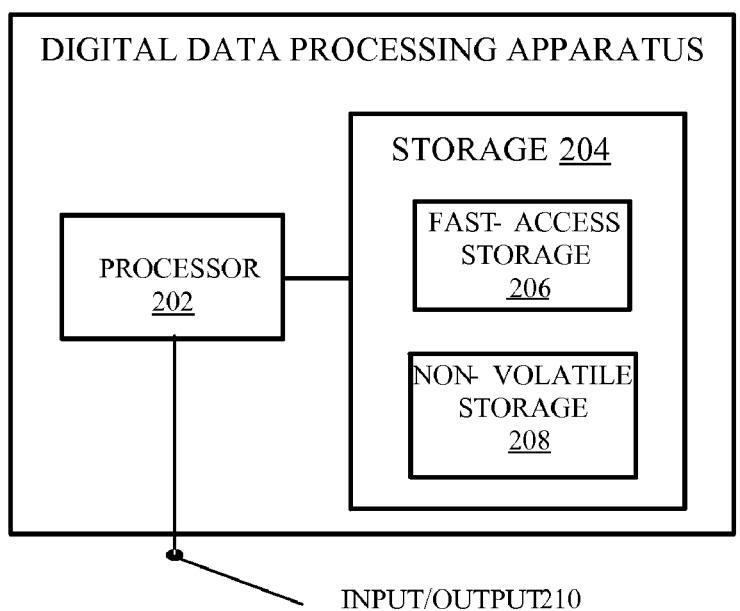
FIG. 2 is a block diagram of a digital data processing equipment.
Figure 3:
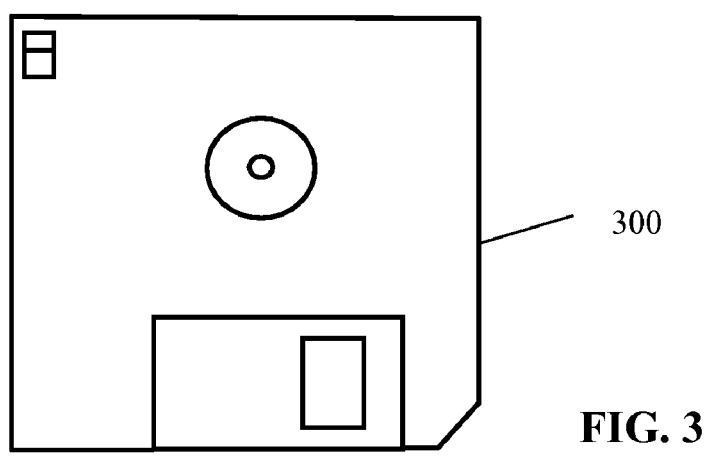
FIG. 3 is a plan view of a signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a removable data storage media 300 (FIG. 3), directly or indirectly accessible by a processor 202. Whether contained in the storage 204, media 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic nonvolatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out some or all of the method aspect of this disclosure. The logic circuitry may be implemented using many different types of circuitry, as discussed above.

Introduction to Operational Details

As mentioned above, one operational aspect of the present disclosure is a process that seeks to predict sleep clock operation, accounting for temperature induced errors that otherwise might interfere with the accurate timekeeping during a reduced power sleep state. Without any limitation, these operational detail are discussed in the context of the circuitry of FIG. 1B where applicable.

Overall Operating Sequence

Figure 4:
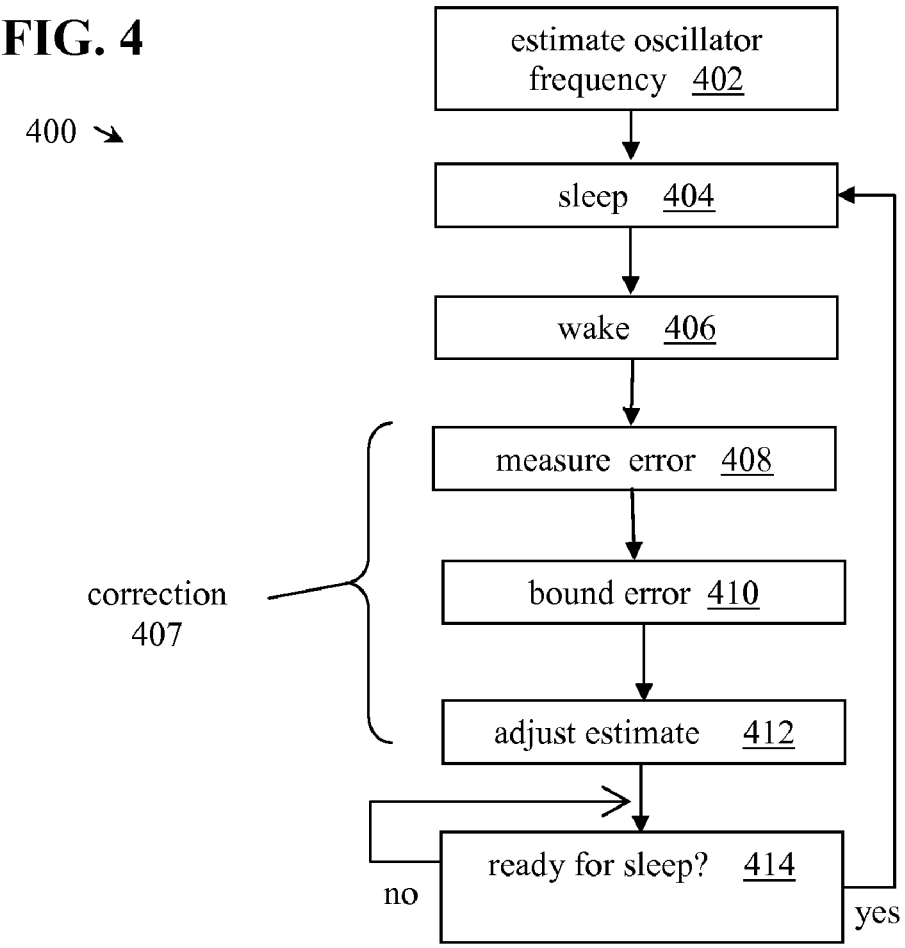
FIG. 4 is a flowchart illustrating a method to conduct sleep/wake operations, including operations to estimate and correct the sleep clock frequency.

FIG. 4 shows a sequence of operations to conduct sleep/wake operations, including operations to estimate and correct the sleep clock frequency. In step 402, the oscillator frequency is estimated to provide an initial value. The estimate may comprise an estimate of the frequency in Hertz or other units, estimate of the length of one oscillation ("clock cycle") of the sleep clock (i.e., frequency$^{-1}$), an estimate of another time reference (such as CDMA chips) per sleep clock period, or any other useful comparison. For example, the original estimate may be 600/16 CDMA chips per sleep clock cycle. This estimate may be pre-set at design/manufacture, programmed upon activation of the device 100, established upon acquisition of network signal by the device 100, recalled from nonvolatile memory upon each boot-up of the equipment 102, etc.

In step 404, components of the device 100 (such as 102, 108, 110, 114, 104, etc.) enter a sleep state for a prescribed duration. The sleep clock 116 is set to wake the equipment 102 at another prescribed time, which is measured in terms of sleep clock oscillations. In step 406, the sleep clock 116 triggers the equipment 102 to wake at the prescribed time. The performance of steps 404, 406 may be conducted according to techniques that are already well known in the art.

Next, the sequence 400 performs a correction operation 407, which further includes steps 408, 410, 412. The operation 407 may be performed, for example, according to the control loop 178 of FIG. 1C. Step 407 serves to predict sleep clock frequency accounting for any temperature induced error experienced by the sleep clock during the last sleep state (404). In step 408, the unit 180 measures the error between expected and actual frequencies of the sleep clock 116. This may be determined, for example, by first determining the actual time that the unit 100 awoke (step 406) according to a network-provided time reference signal, then calculating the difference between actual wakeup time and the wakeup time indicated by the sleep clock, and then computing the erroneous frequency of the sleep clock 116 that must have resulted in the incorrect wakeup time.

In step 410, the unit 180 selectively "bounds" the error measured in step 408. Namely, based on the magnitude of the error and the error history, the unit 180 selectively limits the error to a prescribed maximum value. This helps to eliminate multipath errors from being considered in adjusting the sleep clock for temperature errors. In one example, step 410 uses a predetermined relationship between sleep state duration and predetermined sleep clock error maxima to identify an appropriate maximum error, and selectively limits the current error to the identified maximum error. FIG. 6 shows an example graph of sleep clock error maxima for different sleep times. The details bounding routine are discussed in greater detail below, with reference to FIG. 5.

Next, in step 412, the unit 180 estimates the actual operating frequency of the sleep clock 116 by using the bounded error (from 410). In one embodiment, this is performed by adjusting the previous estimate which arrived from step 402 if the routine 400 is completing for the first time, or otherwise from the last performance of step 412. Although the selection and bounding of errors is novel, the operation of estimating actual operating frequency of sleep clock based on certain measured errors is known in the art, and moreover finds implementation in various commercially available products such as the Verizon model 7135 CDMA phone.

Having prepared a corrected estimate of the sleep clock 116's operating frequency, step 414 then waits until the equipment 102 signals occurrence of the next sleep state, and when this occurs, returns control to step 404. Accordingly, when step 404 is next performed, the equipment 102 utilizes the corrected estimate of the operating frequency (from step 412) when planning the sleep clock value that will match the next wakeup time (406).

Bounding—Specific Example

Figure 5:
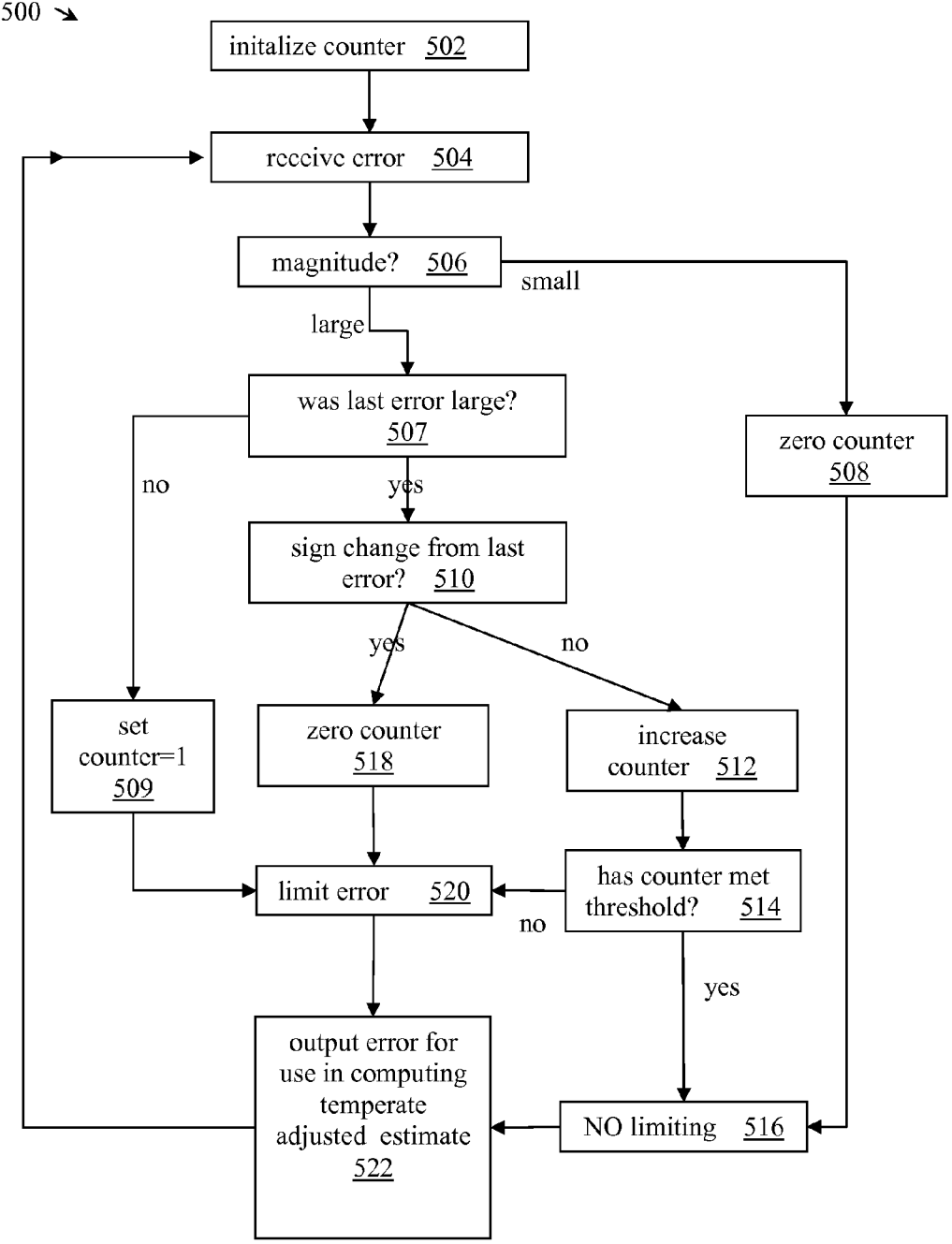
FIG. 5 is a flowchart depicting more detailed operations to correct sleep clock frequency.
Figure 6:
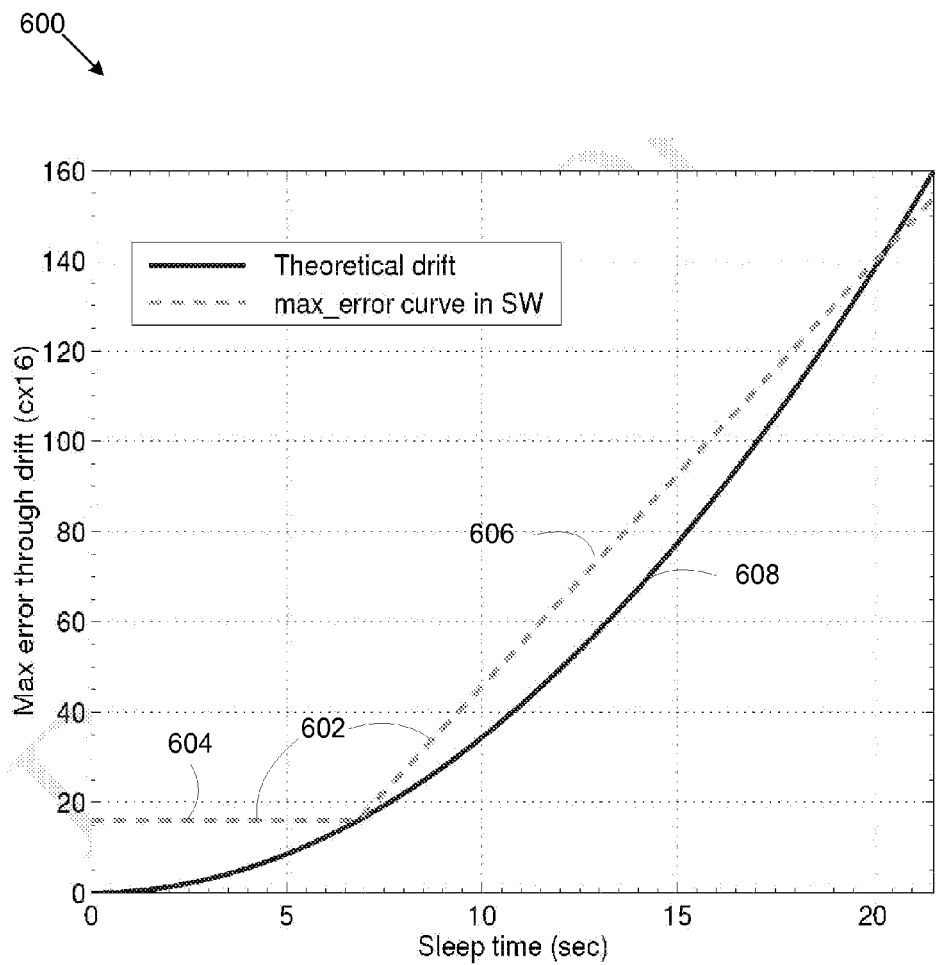
FIG. 6 is a diagram showing worst-case scenario temperature-induced oscillator drift and a corresponding bounding curve, according to one example.

FIG. 5 depicts one example of a bounding routine 500 to implement step 410 from FIG. 4. Step 502 initializes a counter to zero. This counter will count the number of times in-a-row that a large error occurs, which is a likely indication of a temperature induced error. Errors due to multipath may not continuously exhibit the same mathematical sign.

Step 504 receives the "current" error (from step 408). Step 506 compares the error to a given error threshold. If the current error exceeds the error threshold, step 506 proceeds to step 507 (described below). If the current error does not exceed the error threshold, step 506 proceeds to step 508 (also described below). In the illustrated example, the threshold comprises the graph 602 of FIG. 6 (described below). Comparing the current error to the curve 602 ensures that smaller errors (likely to be temperature or noise induced) are routed to steps 508 where they are not bounded, and larger errors (possibly due to multipath) are duly analyzed starting at step 507. For typical sleep times, worst case errors due to temperature-induced oscillator drift are significantly smaller than errors typically caused by changing multipath conditions. The nature of the curve 602 (described below) also ensures that errors that might be due to oscillator switching or similar noise are not bounded, in order to avoid churning.

As mentioned above, smaller errors are handled by step 508. These errors, since they are small, likely occur due to temperature, noise, or another influence other than multipath. This step (508) resets a consecutive-same-sign-large-error counter to zero, and the current error is not bounded (step 516). This counter comprises a device (not shown) of circuitry, software, firmware, or other technology that is implemented as part of the unit 180 or at least accessible thereto. Since the current error is not bounded in this case, the current error itself is output (522) for use in adjusting the estimate in step 412 (FIG. 4). After step 522, the routine 500 returns to step 504 to receive an error for the next sleep state.

As for larger errors, these are handled beginning with step 507. Large errors may occur from temperature or noise, as well as multipath. Step 507 asks whether the last error (from the last sleep state) also exceeded the threshold. If not, the consecutive-same-sign-large-error counter is set to one (step 509), and the current error is limited in step 520. This error (as limited) is then used (522) to estimate the clock frequency. Then, the sequence 500 returns to step 504 to receive the next sleep cycle's error.

In contrast, if the last error was large, step 510 asks whether the current error varies in mathematical sign from the last error. One mathematical sign is used to describe errors where the sleep clock ran fast over the last sleep state, and the opposite mathematical sign is used to describe errors where the sleep clock ran slow. Therefore, whether an error is greater than zero (one sign) or less than zero (the other sign) indicate whether the last sleep state ended early or late.

If step 520 finds a sign change, the error could be from multipath or temperature. Accordingly, the counter is reset to zero (step 518) and the current error is bounded (step 520). The reason for bounding the current error in step 520 is to reduce the amount of jitter in the sleep clock's frequency estimate. In the present example, error bounding occurs according to the graph 602 shown in FIG. 6, and described in greater detail below. After step 520, the current error is output (522) for use in adjusting the estimate in step 412 (FIG. 4). Then, the sequence 500 returns to step 504 to receive the next sleep cycle's error.

In contrast with the foregoing scenario, step 512 (instead of step 518) is used if step 510 finds that the current error does not vary in sign from the last error that exceeded the error threshold. In this circumstance, the error could be from temperature influence alone, which may be confirmed by noting the counter (as discussed in greater detail below). Step 512 increments the counter to record the lack of sign change; in the present example, this is achieved by adding one. Step 514 then asks whether the counter has reached a certain counter threshold. In this example, the counter threshold is set at two, but this number may be varied (manually, adaptively, empirically, or by other means) in order to anticipate more significant multipath problems (by using larger counter thresholds) or more significant temperature changes (by using smaller counter thresholds).

If the counter has not reached the counter threshold, step 514 proceeds to step 520; the current error could be from multipath or temperature, it is impossible to tell yet. Thus, the error is bounded in step 520, and then step 522 is repeated as discussed above.

On the other hand, if step 514 finds that the counter has reached the threshold, the error is definitely not due to multipath, and presumably due to temperature. Accordingly, the error is not limited (step 516), and this value is output (step 522) for use in adjusting the estimate in step 412 (FIG. 4). Then, the routine returns to step 504 to receive the error from the next sleep state.

Bounding—Maxima

FIG. 6 shows a graph 600 to illustrate one embodiment for bounding maxima to be used in step 520. The horizontal axis represents sleep time and the vertical axis represents temperature induced sleep clock error. Boundary 608 illustrates a theoretical, worst-case temperature drift scenario developed through research and discovery of the present inventors. Boundary 602 illustrates a modified representation of the boundary 608, including portions 604, 606. Portion 606 is a linear approximation of the boundary 608 above an error threshold, implemented to conserve computational resources by using a mathematically simpler linear limit. Portion 604 is a base minimum, which purposefully does not follow the theoretical boundary 608. Namely, the portion 604 is established with a sufficiently high value to avoid bounding errors that are probably caused by noise, the switching process of the sleep clock 116, or other sources unrelated to temperature errors. The imposition of portion 604 thereby prevents churning, jitter, and excessive analysis of unpredictable and probably irrelevant errors.

Other Embodiments

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A method for correcting a sleep clock of a wireless communications device to account for temperature induced errors by identifying and limiting probable multipath errors, the method comprising operations of:
   responsive to wakeup following a sleep state, measuring a difference between time reference output by a sleep clock and a network time reference and utilizing the difference to compute a current error in the sleep clock's frequency;
   determining whether predetermined criteria are satisfied by aspects of a current error including (1) magnitude and (2) character in relation to errors from previous sleep states;
   bounding a current error unless the criteria is met, the bounding operation comprising: utilizing a predetermined relationship between sleep state duration and predetermined sleep clock error maxima to identify an appropriate maximum error, and limiting magnitude of the current error to the identified maximum error;
   estimating a sleep clock's frequency utilizing inputs including the limited current error;
   utilizing a most recent estimate of the sleep clock's frequency whenever planning a wakeup time.

2. The method of claim 1, the predetermined criteria being met if the current error exceeds a prescribed threshold and has identical mathematical sign as a specified number of consecutively previous errors, and the consecutively previous errors also exceeded the threshold.

3. The method of claim 2, the predetermined criteria also being met if magnitude of the current error does not exceed the threshold.

4. The method of claim 1, where:
if characteristics of the current error indicate that the current error could be caused by multipath, the bounding operation is performed;
if characteristics of the current error indicate that the current error is not caused by multipath, the bounding operation is omitted.

5. The method of claim 1, the operation of identifying an appropriate maximum error comprising:
for sleep states up to a given duration, selecting a predetermined number;
for sleep states exceeding the given duration, selecting an appropriate value from maxima that increase in a predetermined relationship with increasing sleep state duration.

6. The method of claim 1, the operations further comprising:
repeating the measuring, determining, bounding, estimating, and utilizing operations for each subsequent sleep state.

7. The method of claim 1, the determining operation comprises:
if the current error does not exceed a predetermined threshold, concluding that the criteria is met and resetting a counter;
if the current error exceeds the predetermined threshold, performing operations comprising:
if the current error varies in sign from a last error, and the last error exceeded the threshold, resetting the counter and concluding that the criteria is not met;
if the current error does not vary in sign from the last error, and the last error exceeded the threshold, incrementing the counter and determining whether the counter has reached a specified value;
if yes, concluding that the criteria is met;
if no, concluding that the criteria is not met.

8. A method for minimizing temperature induced errors experienced by a sleep clock used by a wireless communication device, the method comprising the following operations, performed responsive to each wakeup following a sleep state:
consulting a time reference output by a wireless communications network, comparing the time reference to output of the sleep clock, and employing the comparison to compute a current error in sleep clock frequency;
correcting a current error, comprising:
if the current error does not exceed a predetermined threshold, utilizing the current error as the corrected error;
if the current error exceeds the predetermined threshold, performing operations comprising:
if the current error varies in sign from a last error, and magnitude of the last error exceeded the threshold, resetting a counter and limiting the current error according to prescribed maxima that vary according to sleep state duration;
if the current error does not vary in sign from the last error, and the magnitude of the last error exceeded the threshold, incrementing the counter and determining whether the counter has reached a specified value;
if yes, utilizing the current error as the corrected error;
if no, limiting the current error according to the prescribed maxima and utilizing the limited current error as the corrected error;
estimating a sleep clock's frequency utilizing inputs including the corrected error;
utilizing a most recent estimate of the sleep clock's frequency when planning a next wakeup time.

9. A method of correcting a sleep clock of a wireless communications device to account for temperature induced errors by identifying and limiting probable multipath errors, the method comprising operations of:
responsive to wakeup following a sleep state, utilizing a network time reference to determine a current sleep clock frequency error;
utilizing a predetermined relationship between sleep duration and predetermined sleep clock error maxima to identify an appropriate maximum error corresponding to said sleep state;
identifying a conditioned sleep clock frequency error, which comprises the current sleep clock frequency error limited to the identified maximum error, unless errors of identical mathematical sign and exceeding a prescribed threshold have occurred for a predetermined number of consecutive times including the current error, in which case the conditioned sleep clock frequency error comprises the current sleep clock frequency without being limited;
utilizing information including the conditioned sleep clock frequency error to estimate sleep clock frequency.

10. The method of claim 9, further comprising utilizing information including the estimated frequency to plan a future wakeup time.

11. The method of claim 9, wherein slow current sleep clock frequency errors have one mathematical sign and fast current sleep clock frequency errors have an opposite mathematical sign.

12. A method for correcting sleep oscillator operation of a wireless communications device, comprising operations of:
estimating sleep oscillator frequency so as to compensate for estimated temperature induced errors;
in estimating temperature induced errors, treating errors in sleep oscillator frequency as being temperature induced errors, with probable multipath errors being bounded to predetermined sleep clock error maxima corresponding to sleep duration over which the error occurred.

13. The method of claim 12, the treating operation only treating errors whose magnitude exceeds a given threshold, and ignoring sleep clock errors whose magnitude does not exceed the given threshold.

14. The method of claim 12, where the probable multipath errors comprise all errors exceeding a given threshold and not having identical mathematical sign as a predetermined number of consecutively previous errors, where the consecutively previous errors exceeded the given threshold.

15. The method of claim 12, further comprising leaving unbounded such errors that exceed a given threshold and exhibit identical mathematical sign as a given number of consecutively previous errors, where the consecutively previous errors exceeded the given threshold.

16. A signal bearing medium tangibly embodying a program of machine-readable instructions executable by a digital data processor to perform operations for correcting a sleep clock of a wireless communications device to account for temperature induced errors by identifying and limiting probable multipath errors, the operations comprising:
   responsive to wakeup following a sleep state, measuring a difference between time reference output by the sleep clock and a network time reference and utilizing the difference to compute a current error in the sleep clock's frequency;
   determining whether predetermined criteria are satisfied by aspects of the current error including (1) magnitude and (2) character in relation to errors from previous sleep states;
   bounding a current error unless the criteria is met, the bounding operation comprising: utilizing a predetermined relationship between sleep state duration and predetermined sleep clock error maxima to identify an appropriate maximum error, and limiting magnitude of the current error to the identified maximum error;
   estimating a sleep clock's frequency utilizing inputs including the limited current error;
   utilizing a most recent estimate of the sleep clock's frequency whenever planning a wakeup time.

17. A signal bearing medium tangibly embodying a program of machine-readable instructions executable by a digital data processor to perform operations for correcting a sleep clock of a wireless communications device to account for temperature induced errors by identifying and limiting probable multipath errors, the operations comprising:
   responsive to wakeup following a sleep state, utilizing a network time reference to determine a current sleep clock frequency error;
   utilizing a predetermined relationship between sleep duration and predetermined sleep clock error maxima to identify an appropriate maximum error corresponding to said sleep state;
   identifying a conditioned sleep clock frequency error, which comprises the current sleep clock frequency error limited to the identified maximum error, unless errors of identical mathematical sign and exceeding a prescribed threshold have occurred for a predetermined number of consecutive times including the current error, in which case the conditioned sleep clock frequency error comprises the current sleep clock frequency without being limited;
   utilizing information including a conditioned sleep clock frequency error to estimate sleep clock frequency.

18. A signal bearing medium tangibly embodying a program of machine-readable instructions executable by a digital data processor to perform operations for correcting sleep oscillator operation of a wireless communications device, the operations comprising:
   estimating sleep oscillator frequency so as to compensate for estimated temperature induced errors;
   in estimating temperature induced errors, treating sleep oscillator frequency errors as being temperature induced errors, with probable multipath errors being bounded to predetermined sleep clock error maxima corresponding to sleep duration over which the error occurred.

19. Circuitry including multiple interconnected electrically conductive elements configured to perform operations for correcting a sleep clock of a wireless communications device to account for temperature induced errors by identifying and limiting probable multipath errors, the operations comprising:
   responsive to wakeup following a sleep state, measuring a difference between time reference output by the sleep clock and a network time reference and utilizing the difference to compute a current error in the sleep clock's frequency;
   determining whether predetermined criteria are satisfied by aspects of the current error including (1) magnitude and (2) character in relation to errors from previous sleep states;
   bounding a current error unless the criteria is met, the bounding operation comprising: utilizing a predetermined relationship between sleep state duration and predetermined sleep clock error maxima to identify an appropriate maximum error, and limiting magnitude of the current error to the identified maximum error;
   estimating a sleep clock's frequency utilizing inputs including the limited current error;
   utilizing a most recent estimate of the sleep clock's frequency whenever planning a wakeup time.

20. Circuitry including multiple interconnected electrically conductive elements configured to perform operations for correcting a sleep clock of a wireless communications device to account for temperature induced errors by identifying and limiting probable multipath errors, the operations comprising:
   responsive to wakeup following a sleep state, utilizing a network time reference to determine a current sleep clock frequency error;
   utilizing a predetermined relationship between sleep duration and predetermined sleep clock error maxima to identify an appropriate maximum error corresponding to said sleep state;
   identifying a conditioned sleep clock frequency error, which comprises the current sleep clock frequency error limited to the identified maximum error, unless errors of identical mathematical sign and exceeding a prescribed threshold have occurred for a predetermined number of consecutive times including the current error, in which case the conditioned sleep clock frequency error comprises the current sleep clock frequency without being limited;
   utilizing information including the conditioned sleep clock frequency error to estimate sleep clock frequency.

21. Circuitry including multiple interconnected electrically conductive elements configured to perform operations for correcting sleep oscillator operation of a wireless communications device, the operations comprising:
   estimating sleep oscillator frequency so as to compensate for estimated temperature induced errors;
   in estimating temperature induced errors, treating sleep oscillator frequency errors as being temperature induced errors, with probable multipath errors being bounded to predetermined sleep clock error maxima corresponding to sleep duration over which the error occurred.

22. A wireless communications device, comprising:
   a transceiver;
   a speaker;
   a microphone;
   a user interface;
   data processing equipment, coupled to the transceiver, speaker, microphone, and user interface, and programmed to perform operations for correcting a sleep clock of a wireless communications device to account for temperature induced errors by identifying and limiting probable multipath errors, the operations comprising:
  responsive to wakeup following a sleep state, measuring a difference between time reference output by the sleep clock and a network time reference and utilizing the difference to compute a current error in the sleep clock's frequency;
  determining whether predetermined criteria are satisfied by aspects of the current error including (1) magnitude and (2) character in relation to errors from previous sleep states;
  bounding the current error unless the criteria is met, the bounding operation comprising: utilizing a predetermined relationship between sleep state duration and predetermined sleep clock error maxima to identify an appropriate maximum error, and limiting magnitude of the current error to the identified maximum error;
  estimating the sleep clock's frequency utilizing inputs including the limited current error;
  utilizing a most recent estimate of the sleep clock's frequency whenever planning a wakeup time.

23. A wireless communications device, comprising:
  a transceiver;
  a speaker;
  a microphone;
  a user interface;
  data processing equipment, coupled to the transceiver, speaker, microphone, and user interface, and programmed to perform operations for correcting a sleep clock of a wireless communications device to account for temperature induced errors by identifying and limiting probable multipath errors, the operations comprising:
    responsive to wakeup following a sleep state, utilizing a network time reference to determine a current sleep clock frequency error;
    utilizing a predetermined relationship between sleep duration and predetermined sleep clock error maxima to identify an appropriate maximum error corresponding to said sleep state;
    identifying a conditioned sleep clock frequency error, which comprises the current sleep clock frequency error limited to the identified maximum error, unless errors of identical mathematical sign and exceeding a prescribed threshold have occurred for a predetermined number of consecutive times including the current error, in which case the conditioned sleep clock frequency error comprises the current sleep clock frequency without being limited;
    utilizing information including the conditioned sleep clock frequency error to estimate sleep clock frequency.

24. A wireless communications device, comprising:
  a transceiver;
  a speaker;
  a microphone;
  a user interface;
  data processing equipment, coupled to the transceiver, speaker, microphone, and user interface, and programmed to perform operations for correcting sleep oscillator operation of a wireless communications device, the operations comprising:
    estimating sleep oscillator frequency so as to compensate for estimated temperature induced errors; in estimating temperature induced errors, treating sleep oscillator frequency errors as being temperature induced errors, with probable multipath errors being bounded to predetermined sleep clock error maxima corresponding to sleep duration over which the error occurred.

25. A wireless mobile telephone, comprising:
  transceiver means for wireless transmitting and receiving signals;
  speaker means for producing audio output;
  microphone means for a microphone;
  user interface means for receiving user input and providing human-readable output;
  data processing means, coupled to the transceiver means, speaker means, microphone means, and user interface means, for performing operations to correct a sleep clock of a wireless communications device to account for temperature induced errors by identifying and limiting probable multipath errors, the operations comprising:
    responsive to wakeup following a sleep state, measuring a difference between time reference output by the sleep clock and a network time reference and utilizing the difference to compute a current error in the sleep clock's frequency;
    determining whether predetermined criteria are satisfied by aspects of the current error including (1) magnitude and (2) character in relation to errors from previous sleep states;
    bounding the current error unless the criteria is met, the bounding operation comprising: utilizing a predetermined relationship between sleep state duration and predetermined sleep clock error maxima to identify an appropriate maximum error, and limiting magnitude of the current error to the identified maximum error;
    estimating the sleep clock's frequency utilizing inputs including the limited current error;
    utilizing a most recent estimate of the sleep clock's frequency whenever planning a wakeup time.

26. A wireless communications device, comprising:
  transceiver means for wireless transmitting and receiving signals;
  speaker means for producing audio output;
  microphone means for a microphone;
  user interface means for receiving user input and providing human-readable output;
  data processing means, coupled to a transceiver means, speaker means, microphone means, and user interface means, for performing operations to correct a sleep clock of a wireless communications device to account for temperature induced errors by identifying and limiting probable multipath errors, the operations comprising:
    responsive to wakeup following a sleep state, utilizing a network time reference to determine a current sleep clock frequency error;
    utilizing a predetermined relationship between sleep duration and predetermined sleep clock error maxima to identify an appropriate maximum error corresponding to said sleep state;
    identifying a conditioned sleep clock frequency error, which comprises the current sleep clock frequency error limited to the identified maximum error, unless errors of identical mathematical sign and exceeding a prescribed threshold have occurred for a predetermined number of consecutive times including the current error, in which case the conditioned sleep
clock frequency error comprises the current sleep
clock frequency without being limited;

utilizing information including the conditioned sleep
clock frequency error to estimate sleep clock frequency.

27. A wireless communications device, comprising:

transceiver means for wireless transmitting and receiving signals;

speaker means for producing audio output;

microphone means for a microphone;

user interface means for receiving user input and providing human-readable output;

data processing means, coupled to a transceiver means, speaker means, microphone means, and user interface means, for performing operations for correcting sleep oscillator operation of a wireless communications device, the operations comprising:

estimating sleep oscillator frequency so as to compensate for estimated temperature induced errors;

in estimating temperature induced errors, treating sleep oscillator frequency errors as being temperature induced errors, with probable multipath errors being bounded to predetermined sleep clock error maxima corresponding to sleep duration over which the error occurred.

* * * * *